United States Patent [19]
Ono

[11] Patent Number: 5,690,287
[45] Date of Patent: Nov. 25, 1997

[54] FISHING REEL WITH ROTATIONAL INDEPENDENCE OF SPOOL AND HANDLE

[76] Inventor: Shigehiko Ono, 1-35 Fujibayashi-cho Takagamine Kita-ku, Kyoto, Japan

[21] Appl. No.: 741,318

[22] Filed: Oct. 30, 1996

Related U.S. Application Data

[63] Continuation of Ser. No. 298,448, Aug. 29, 1994, abandoned.

[30] Foreign Application Priority Data

Aug. 31, 1993 [JP] Japan .................................. 5-216589

[51] Int. Cl.[6] .................................................. A01K 89/01
[52] U.S. Cl. .................................. 242/255; 74/810.1
[58] Field of Search ........................ 74/810.1; 242/255, 242/260

[56] References Cited

U.S. PATENT DOCUMENTS

| | | | |
|---|---|---|---|
| 889,974 | 6/1908 | Schreidt | 242/255 |
| 1,991,756 | 2/1935 | Lazich | 74/810.1 |
| 2,240,075 | 4/1941 | Kovalovsky et al. | 242/255 |
| 2,380,213 | 7/1945 | Boor | 242/255 |
| 2,713,274 | 7/1955 | Lockwood | 242/255 |
| 2,836,995 | 6/1958 | Heddy | 242/255 |
| 3,325,117 | 6/1967 | Hiromitsu | 242/255 |
| 3,408,021 | 10/1968 | Nichols | 242/255 |

FOREIGN PATENT DOCUMENTS 122980  12/1946  Australia .................................. 74/810.1

*Primary Examiner*—Katherine Matecki
*Attorney, Agent, or Firm*—Jordan and Hamburg

[57] ABSTRACT

A fishing reel includes a pair of side frames, a spool shaft, which is rotatably supported to the side frames, one end of the spool shaft protrudes sidewards from the adjacent side frame, and a spool carried on the spool shaft between the side frames. A handle shaft extends from the same side frame from which the spool shaft protrudes sidewards so that the lengthwise axis of the handle shaft is in parallel relationship to that of the spool shaft. A handle is operatively connected to the handle shaft for applying rotational force to the spool. A direction maintaining mechanism is provided between the handle shaft and the spool shaft such that the rotational force effected by the handle is transmitted to the spool so as to always rotate the spool in a predetermined direction thereof regardless of rotational direction of the handle. A speed adjusting mechanism is provided between the handle shaft and the spool shaft to adjust a rotational speed of the spool by changing a rotational direction of the handle.

11 Claims, 6 Drawing Sheets

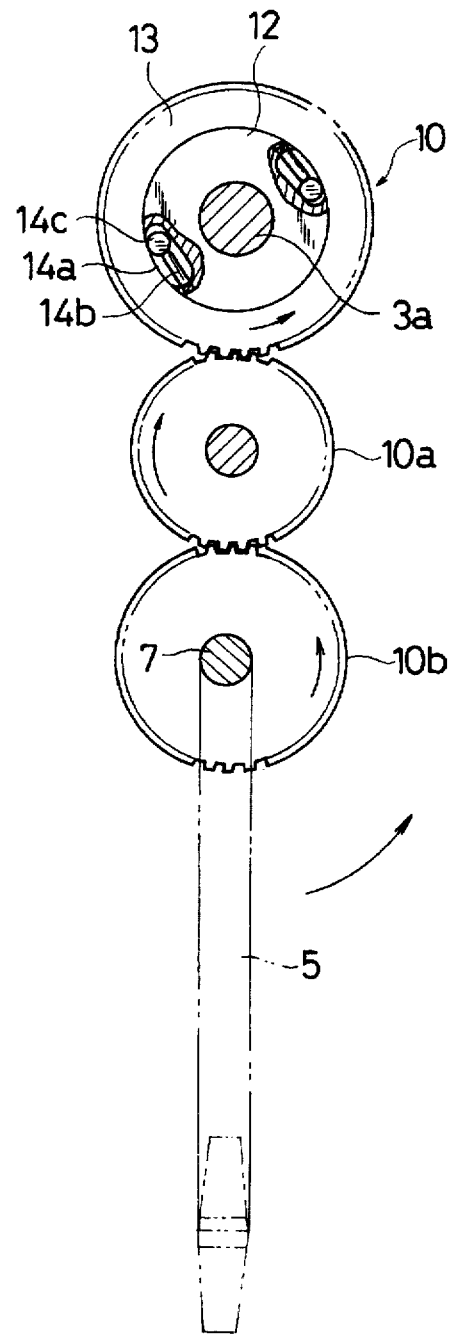
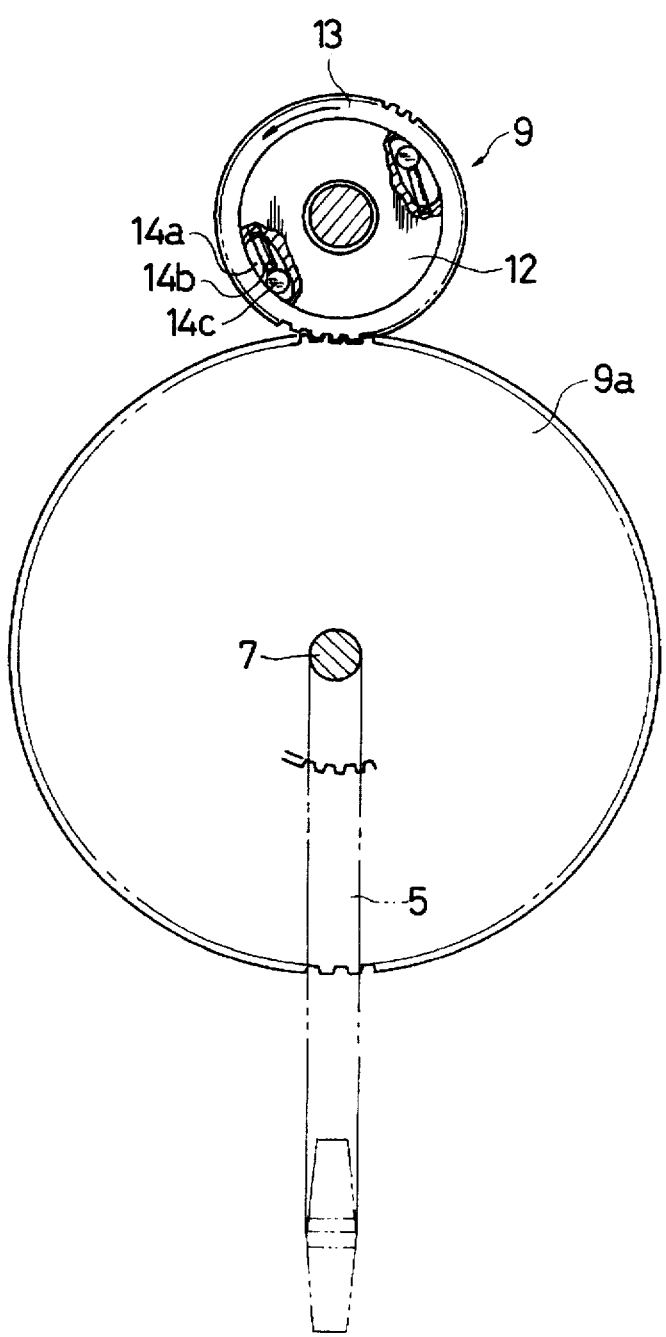
FIG. 5A
FIG. 5B

FISHING REEL WITH ROTATIONAL INDEPENDENCE OF SPOOL AND HANDLE

This application is a continuation of application Ser. No. 08/298,448 filed Aug. 29, 1994, now abandoned.

BACKGROUND OF THE INVENTION

This invention relates to a fishing reel, and more particularly to a fishing reel with a mechanism for maintaining the rotational direction of a spool regardless of the rotational direction of a handle, and a mechanism for changing a rotational speed of the spool.

A conventional reel includes a pair of side frames, a spool rotatably secured to the side frames, a spool shaft inserted into the spool, and a handle linked to the spool shaft so as to rotate the spool therethrough by the rotation of the handle. When a reel of this type is used by attaching it to a fishing rod, an angler unwinds a fishing line from the spool for positioning a fishing jig, such as a lure, which is attached to the fishing line at a desired point. Once the lure is attacked by a fish, the angler winds the fishing line at various speeds so as to correspond to motions of the fish and to maintain the tension of the line at a desirable force by rotating the handle rapidly or slowly.

However, it is difficult for the angler to control the speed of the spool and to tension the line at a desired force, while adjusting pulling force corresponding to motions of the fish merely by rotating the handle rapidly or slowly. In addition, when the angler happens to rotate the handle of the fishing reel in an unintentional direction, the fishing line may be excessively slackened or tensed with the result being the fishing line may suddenly break. This is a fatal problem in the fishing reel of this type.

SUMMARY OF THE INVENTION

It is an object of the present invention to provide a fishing reel which readily and constantly keeps a fishing line under a predetermined tension force by rotating a spool in a winding direction thereof at varying speeds by rotating a handle in clockwise and counterclockwise directions.

It is another object of the present invention to provide a fishing reel with a simple structure which can be readily handled.

Accordingly, there is provided a fishing reel including a pair of side frames, a spool shaft, which is rotatably supported to the side frames, one end of the spool shaft protrudes sidewards from the adjacent side frame, and a spool is carried on the spool shaft between the side frames. A handle shaft extends from the side frame from which the side spool shaft protrudes sidewards so that the lengthwise axis thereof is in parallel relationship to that of the spool shaft. A handle is operatively connected to the handle shaft for applying rotational force to the spool. A direction maintaining mechanism is provided between the handle shaft and the spool shaft such that the rotational force effected by the rotation of the handle is transmitted to the spool so as to always rotate the spool in a predetermined direction thereof, regardless of rotational direction of the handle. A speed adjusting mechanism is provided between the handle shaft and the spool shaft to adjust a rotational speed of the spool by changing a rotational direction of the handle.

With the above arrangement, after unwinding the fishing line from the spool so as to leave a fishing jig at a desirable point, an angler slightly rotates the handle to tension the fishing line at a predetermined force. Once a fish has attacked the fishing jig, the angler rotates the handle to wind the fishing line to correspond to the movement of the fish. The angler can rotate the spool at different speeds by merely changing a rotational direction of the handle, while winding the line and while maintaining the rotational speed of the handle, because a mechanism for adjusting a rotational speed of the spool is provided between the spool shaft and the handle shaft. As a result, the angler can wind the fishing line at different speeds around the spool, while adequately and instantly corresponding to the movement of the fish, by merely changing the rotational direction of the handle.

Further, by providing a mechanism between the spool shaft and the handle shaft for transmitting rotational force to the spool, so as to always rotate the spool in a winding direction thereof, the fishing line can be securely wound around the spool even when the angler happens to rotate the handle in an unintentional direction.

The above, and other objects, features and advantages of the present invention will become apparent from the detailed description thereof read in conjunction with the accompanying drawings, which are given byway of illustration only, and, thus, do not limit the present invention.

BRIEF DESCRIPTION OF THE DRAWINGS

FIGS. 5A and 5B are elevations illustrating two sets of gears.

DETAILED DESCRIPTION OF THE PREFERRED EMBODIMENTS

Embodiments of the present invention will be described with reference to the drawings.

Figure 1:
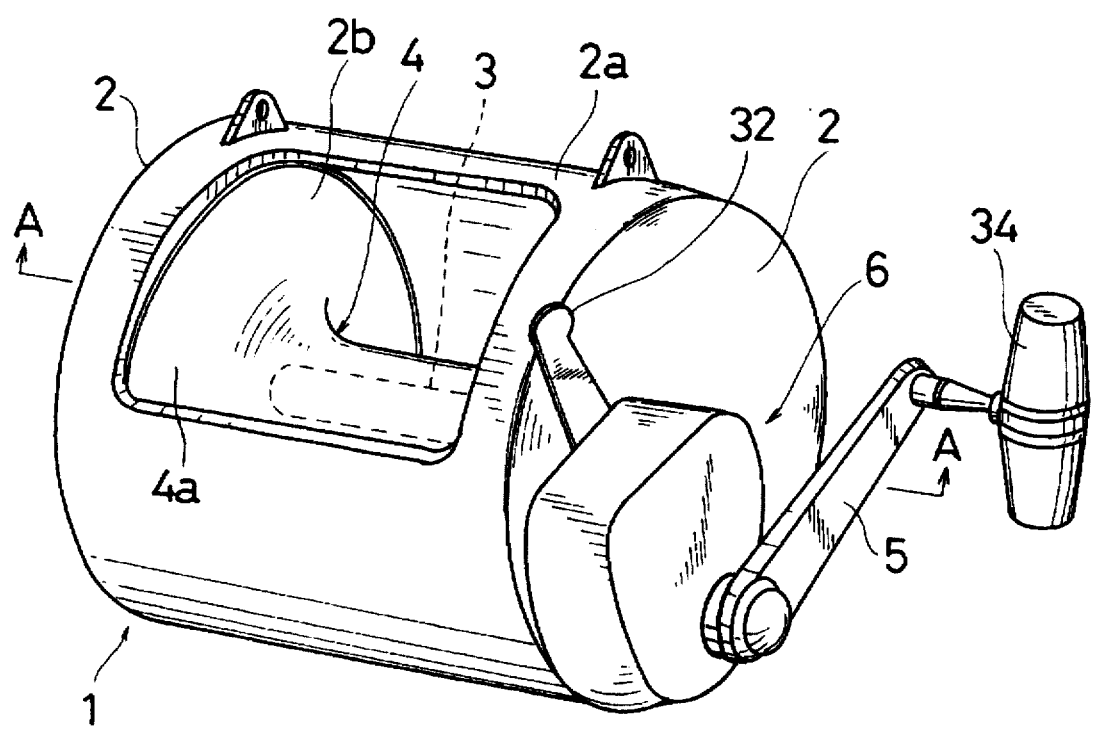
FIG. 1 is a perspective view illustrating one embodiment of a fishing reel of the present invention omitting shift levers 30$d$ and 31$d$ of FIG. 3.
Figure 2:
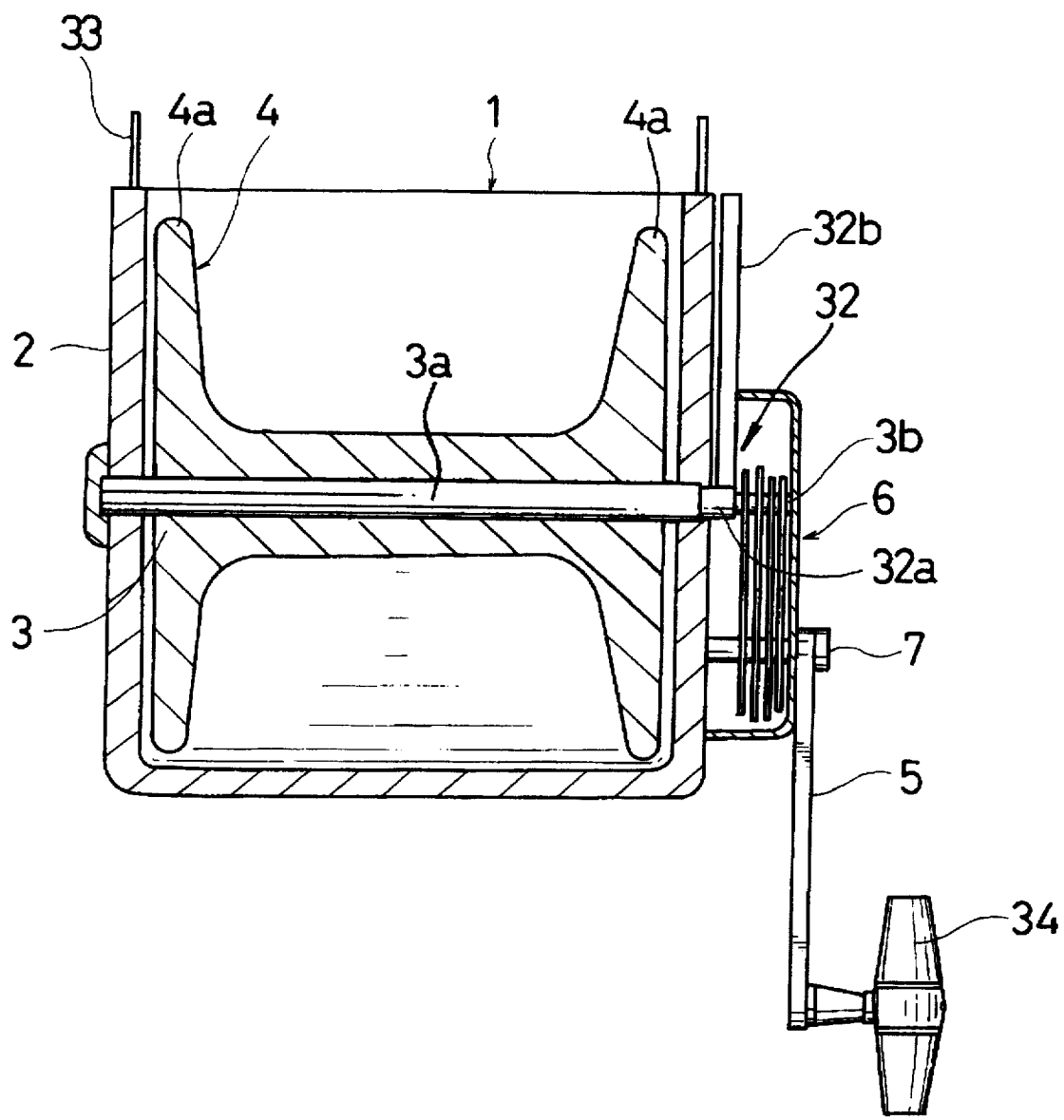
FIG. 2 is a cross sectional view taken along line A—A of FIG. 1 omitting shift levers 30$d$ and 31$d$ of FIG. 3.

Referring to FIGS. 1 and 2, a reel body 1 has a pair of side frames 2, 2 which are supported by an annular frame 2$a$. A rectangular opening 2$b$ is defined in the annular frame 2$a$. Between the side frames 2, 2 is provided a spool 4 which is provided with a pair of flanges 4$a$, 4$a$ at both its ends and into which a spool shaft 3 is inserted. The spool shaft 3 is rotatably supported at both its ends to the side frames 2. A handle 5 is disposed outside of the side frame 2 to be rotatable in clockwise and counterclockwise directions, and is provided at its outer end with a grip 34. The spool shaft 3 comprises an inner shaft 3$a$ and an outer shaft 3$b$, which are separably linked to each other via a clutch mechanism 32.

Figure 3:
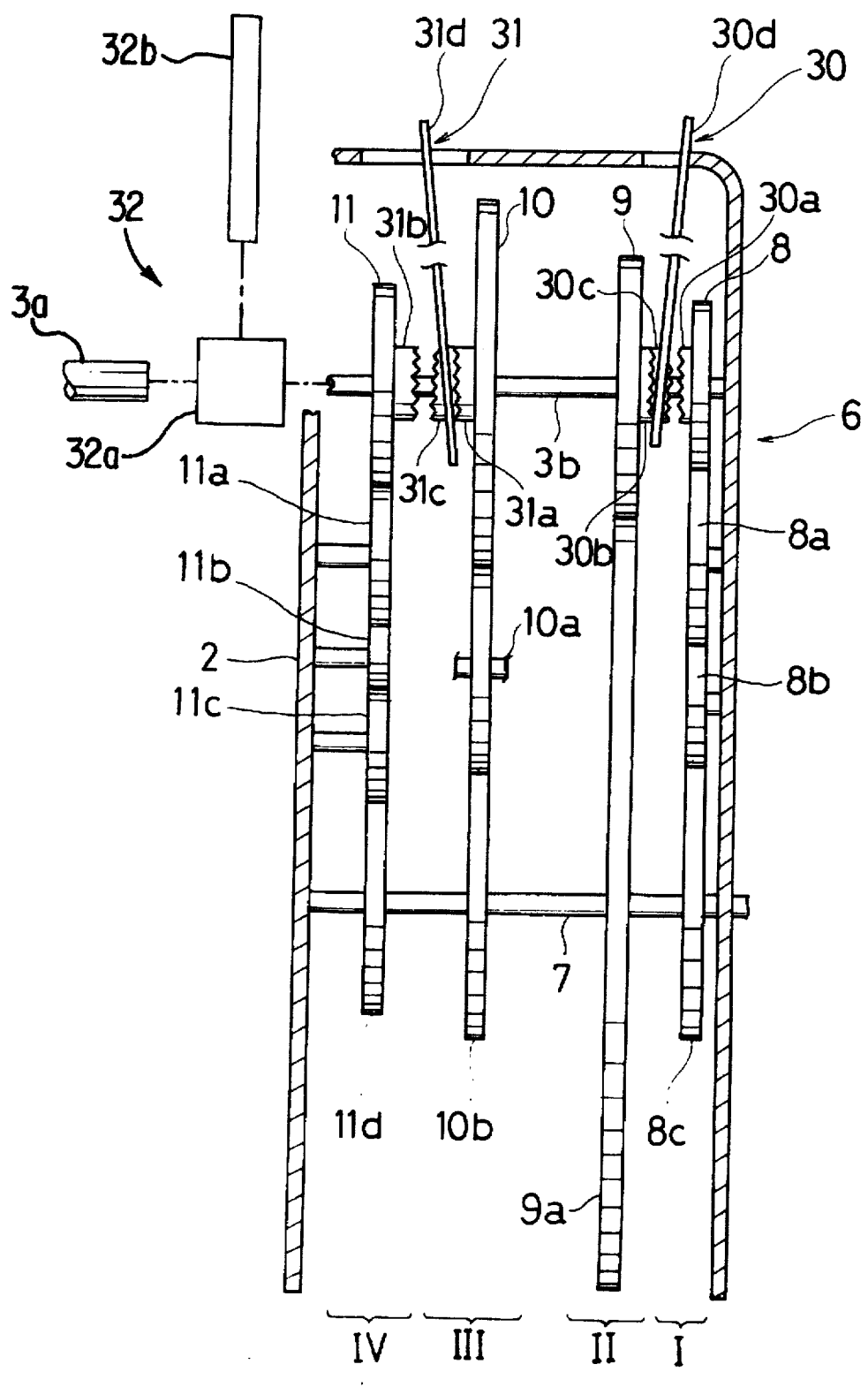
FIG. 3 is a cross sectional view illustrating a gear box in accordance with the present invention.
Figure 4A:
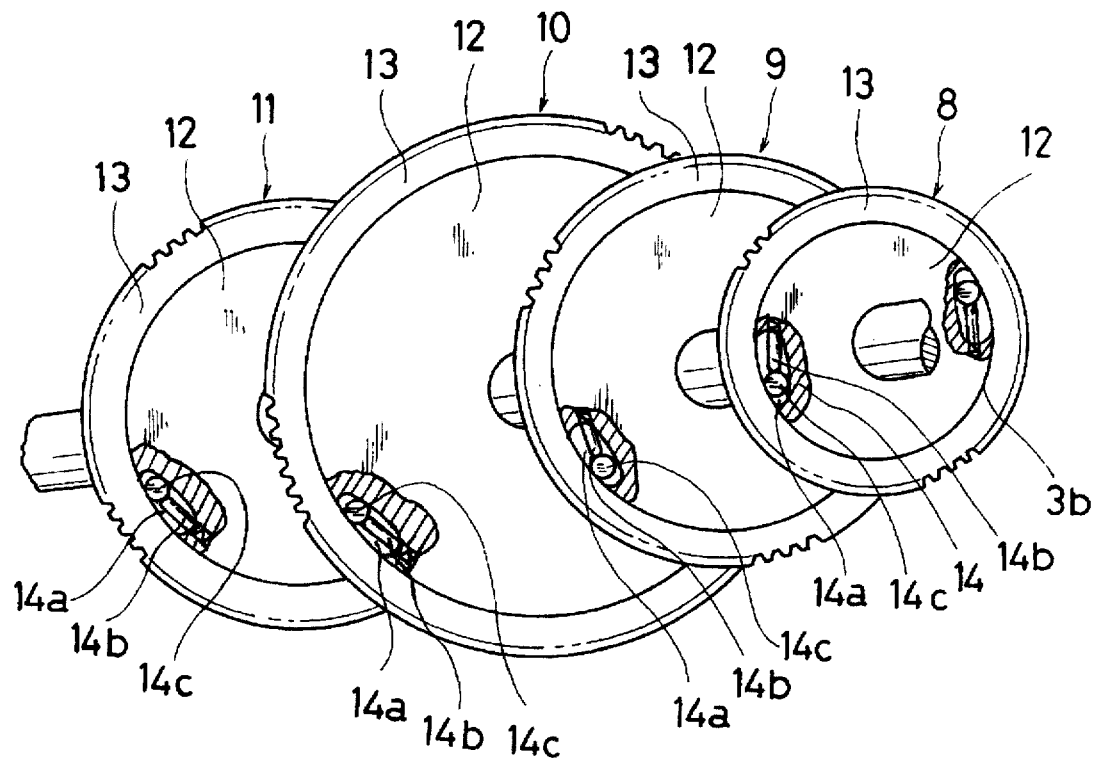
FIG. 4A is a perspective view illustrating a group of gears which are fixed to an outer shaft.
Figure 4B:
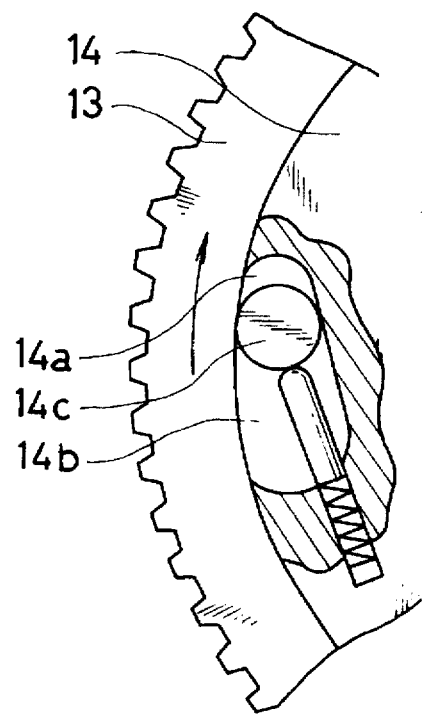
FIGS. 4B and 4C are partially enlarged elevations illustrating engaging states between an outer ring and an inner plate of the gear of FIG. 4A.
Figure 4C:
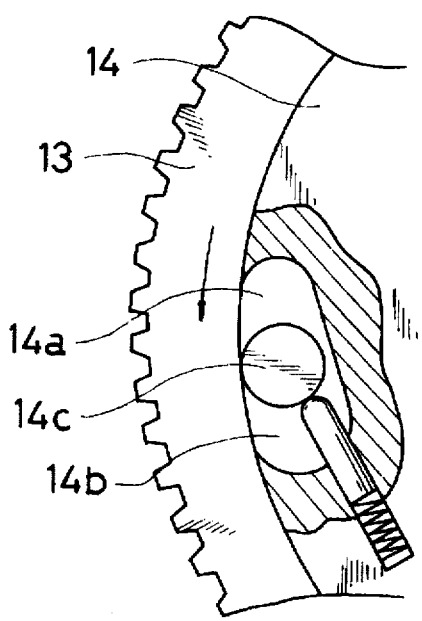

Referring to FIGS. 3 and 4, a gear box 6 encases therein the outer shaft 3$b$, and a handle shaft 7, one end of which is connected to the handle 5. Four gears 8, 9, 10, 11 into which the outer shaft 3$b$ is inserted, have different diameters from each other. Each of these gears includes an inner plate 12 and an outer ring 13 which is slidable around the corresponding inner plate 12 and which have teeth on outer peripheries thereof. Each of the inner plates 12 has a pair of locking members 14, each of which includes an elongate hole 14a which extends substantially in the circumferential direction of the inner plate 12. A pressing member 14b is urged with springs outwardly with respect to the inner plate 12. An abutting member 14c is cylindrically shaped and is pressed against the outer ring 13 by the pressing member 14b. The elongate hole 14a is opened to the inner periphery of the outer ring 13 and is defined by having a wider portion with its width larger than the diameter of the abutting member 14c, and a narrower portion with its width smaller than the diameter of the abutting member 14c. The abutting member 14c is pressed radially and outwardly by the pressing member 14b so as to always contact the inner surface of the outer ring 13 at any point along the inner surface of the elongate hole 14a.

With this arrangement, when the outer ring 13 is rotated, the abutting member 14c is moved in the same direction as the outer ring 13 by the movement of the outer ring 13. Once the abutting member 14c is moved into the narrower portion of the elongate hole 14a, the abutting member 14c is locked between the outer ring 13 and the inner plate 12; the result being the rotary force can be transmitted from the outer ring 13 to the outer shaft 3b. On the contrary, when the outer ring 13 is rotated in such a direction that the abutting member 14c is released from the locked condition, the rotary force is not transmitted from the outer ring 13 to the inner plate 12.

Referring to FIG. 3, a first group I of gears 8, 8a, 8b, 8c a second group II of gears 9, 9a, a third group III of gears 10, 10a, 10b, and a fourth group IV of gears 11, 11a, 11b, 11c, 11d, each of the lowermost gears of which is connected to the handle shaft 7, respectively transfer rotational force from the handle shaft 7 to the outer shaft 3b by the rotation of the handle 5.

The first group I and the second group II have respectively even-numbered gears such that the spool shaft 3 is rotated in the opposite direction to that of the handle 5. The third group III and the fourth group IV have respectively odd-numbered gears such that the spool shaft 3 is rotated in the same direction as that of the handle 5. The narrower portions of hole 14a of the locking members 14 of the first and second groups I, II are directed to the same circumferential direction with respect to each inner plate 12.

On the other hand, the narrower portions of hole 14a of the locking members 14 of the third and fourth groups III, IV are directed in the opposite circumferential direction to that of the first and second groups I, II. With this arrangement, when the handle 5 is rotated in such a direction that each of the abutting members 14c of the gears 8, 9 is moved into the narrower portion of the elongate hole 14a, each of the abutting members 14c of the gears 10, 11 is moved into the wider portion of the elongate hole 14a.

As is apparent from the above description, when the handle 5 is rotated in the opposite direction, the abutting members 14c also move to the opposite portions of the elongate holes 14a. Thus, the rotary force transmitted from the handle shaft 7 via the first and second groups I, II, which respectively have the even-numbered gears, does not cause the rotation of the outer shaft 3b, while the third and fourth groups III, IV, which respectively have the odd-numbered gears, cause the rotation of the outer shaft 3b, or vice versa. FIGS. 5A and 5B illustrate these motions by exemplifying the second and third groups II, III. As a result, the spool shaft 3 is always rotated in the same direction regardless of rotational directions of the handle 5.

A pair of dog clutch mechanisms 30, 31 are disposed respectively between the gears 8, 9 and between the gears 10, 11, as shown in FIG. 3. A first dog clutch mechanism 30 includes flange 30a which is fixed to the gear 8, flange 30b which is fixed to the gear 9, flange 30c which is slidable along the longitudinal axis of the outer shaft 3b between the flanges 30a, 30b, and a clutch lever 30d which is connected to the flange 30c. A second dog clutch mechanism 31 is identical in structure to the first dog clutch mechanism 30. Flange 31a is fixed to the gear 10, flange 31b is fixed to the gear 11, flange 31c is slidable along the longitudinal axis of the outer shaft 3b between the flanges 31a, 31b, and a clutch lever 31d is connected to the flange 31c. The outer shaft 3b may be a spline shaft and each of the flanges 30c, 31c has a through-hole having a corresponding shape, into which the outer shaft 3b is inserted, thereby allowing the flanges 30c, 31c to be axially moved but arresting the rotation thereof independently when the outer shaft 3b is not rotated. The gear ratios among the four groups I, II, III, IV are set to be different from each other such that the outer shaft 3b can be rotated at various speeds.

With this arrangement, when the angler rotates the handle 5 in such a direction that the first and second groups I, II transmit the rotary force from the handle shaft 7 to the outer shaft 3b, and the third and fourth groups III, IV do not transmit the rotary force to the outer shaft 3b, the rotary speed of the outer shaft 3bcan be changed by selectively bringing the flange 30c into engagement with either the flange 30a or the flange 30b by shifting the clutch lever 30d, without changing the rotational speed of the handle 5.

A clutch mechanism 32 (shown schematically) which includes a clutch 32a and a clutch lever 32b fixed to the clutch 32a, is provided between the outer shaft 3b and the inner shaft 3a so as to link these shafts to each other. The shafts are linked by shifting the clutch lever 32b.

In operation, the fishing reel is first fixed to a fishing rod (not shown) via a conventional fixing means (not shown). The clutch lever 32b is moved in such a direction that the outer shaft 3b is disengaged from the inner shaft 3a to allow the spool 4 to be freely rotated and release a fishing line (not shown) therefrom. Thus, a fishing jig (not shown) can be placed in a desirable position. After the fishing line is unwound a predetermined length, the clutch lever 32b is shifted in such a direction that the outer shaft 3b is engaged to the inner shaft 3a, and then the handle 5 is rotated to rotate the spool 4 and, consequently, tighten the fishing line at a predetermined force.

Once a fish has attacked the fishing jig, it is likely the fishing line will be excessively released due to the pulling force of the fish. To avoid such excessive releasing of the fishing line, the angler properly rotates the handle 5 clockwise or counterclockwise, while shifting the clutch levers 30d, 31d to different positions, with the result being the fishing line can be wound around the spool 4 at various speeds, while the rotational speed of the handle 5 can be maintained.

Figure 6:
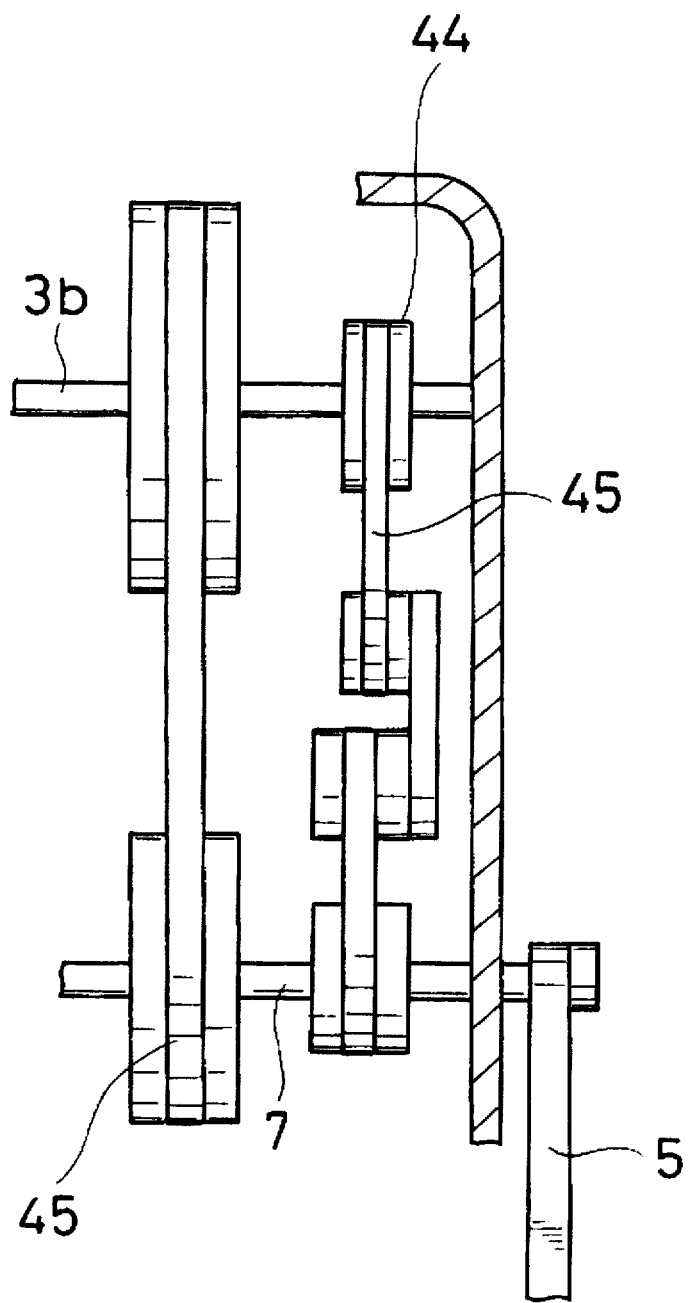
FIG. 6 is a cross sectional view illustrating a mechanism for maintaining a rotational direction of the spool in accordance with another embodiment of the present invention.

In the above embodiment, as a means for maintaining a rotational direction of the spool 4, a plurality of gears are employed. However, a plurality of rollers 44, shown in FIG. 6, may be employed in a fishing reel of the present invention. In this case, endless belts 45 are wound between rollers 44. Alternatively, a plurality of gears may be engaged to each other via chains or the like. It is essential to maintain a rotational direction of the spool 4 regardless of a rotational direction of the handle 5.

In the above embodiment, to change a rotational speed of the spool 4 by selectively using the groups of gears, each of the groups have different gear ratios by forming all of the gears with their diameters different from each other. However, in the alternative, a selective number of the gears may be formed so as to have different diameters, while the residual gears are unitarily formed. It is essential to rotate the spool 4 at different speeds, while maintaining a rotational speed of the handle 5.

Further, the gears which are fixed to the handle shaft 7 may comprise the inner plates 12, the outer rings 13 and the locking members 14, instead of the gears which are fixed to the outer shaft 3b.

This specification is by no means intended to restrict the present invention to the preferred embodiments set forth therein. Various modifications to the inventive fishing reel, as described herein, may be made by those skilled in the art without departing from the spirit and scope of the present invention as defined in the appended claims.

What is claimed is:

1. A fishing reel comprising:
a pair of side frames having a spool shaft rotatably supported by said side frames with one end of said spool shaft protruding sidewards from one of said side frames;
a spool carried on said spool shaft between said side frames;
a handle shaft extending from said side frame from which said spool shaft protrudes sidewards, said handle shaft having a handle coupled thereto for applying rotational force to said handle shaft;
means for rotating said spool in a predetermined direction in response to rotation of said handle regardless of a rotational direction of said handle, said means for rotating being provided between said spool shaft and said handle shaft, said means for rotating having at least two groups of gears;
a first group of gears of said at least two groups of gears having an even number of gears and a first direction dependent coupling means for unidirectionally transmitting rotational force from said handle shaft to said spool shaft via said gears of said first group when said handle shaft is rotated in a first direction and transmitting no rotational force when said handle shaft is rotated in a second direction; and
a second group of gears of said at least two groups of gears having an odd number of gears and a second direction dependent coupling means for unidirectionally transmitting rotational force from said handle shaft to said spool shaft via said gears of said second group when said handle shaft is rotated in said second direction and transmitting no rotational force when said handle shaft is rotated in said first direction.

2. A fishing reel as set forth in claim 1, wherein said first and second groups of gears comprise means for adjusting a gearing ratio of said spool shaft to said handle shaft by changing a rotational direction of said handle to select one of said at least two groups of gears to transmit rotational force from said handle shaft to said spool shaft, while maintaining the rotation of the spool in said predetermined direction, wherein said means for adjusting a gearing ration is a difference in gear ratios between the gears of one of said at least two groups of gears and the gears of another of said at least two groups of gears, whereby selective use of one of said at least two groups of gears functions to adjust said gearing ratio.

3. The fishing reel as set forth in claim 1, wherein:
each of said gears in said second group of gears is engaged with each other in line and said second group has a pair of outermost gears;
each of said gears in said first group of gears is engaged with each other in line and said first group has a pair of outermost gears;
the outermost gears of each of said first and second groups of gears connecting said first and second groups of gears to said spool shaft and said handle shaft, whereby said second group of gears enables said handle shaft to rotate said spool shaft in said predetermined direction when said handle is rotated in a first direction and said first group of gears enables said handle shaft to rotate said spool shaft in said predetermined direction opposite to the predetermined direction when said handle is rotated in a second direction opposite said first direction; and
one of said outermost gears of said first group of gears and one of said outermost gears of said second group of gears each have one of said direction dependent coupling means for unidirectionally coupling its respective gear group to one of said spool shaft and said handle shaft.

4. The fishing reel as set forth in claim 3, wherein each of said direction dependent coupling means comprises;
an inner plate and an outer ring slidably fitted around said inner plate;
said outer ring having an outer periphery with teeth for engaging gears thereby forming a respective one of said pair of outermost gears; and
a locking means in said inner plate, said locking means including:
a tapered elongate opening positioned at a peripheral portion of said inner plate extending substantially in a circumferential direction of said inner plate and opening to an inner periphery of said outer ring
said elongate opening having a narrower portion and a wider portion;
an abutting member loosely positioned in said elongate opening, the diameter of said abutting member being larger than said narrower portion and smaller than said wider portion so as to be movable between said narrower portion and said wider portion;
a pressing member biased by a spring against said abutting member such that said abutting member is maintained in contact with the inner periphery of said outer ring at any point in said elongate opening;
said abutting member being lockable between said inner plate and said outer ring when said abutting member is moved into said narrower portion of said elongate opening by rotation of said outer ring relative to said inner plate in a first direction to transmit rotational force to said spool;
said abutting member being unlockable by movement into said wider portion in response to rotation of said outer ring relative to said inner plate in a second direction so as not to transmit said rotational force to said spool; and
said narrower portion of said elongate opening of said locking means of said second group of gears being directed to an opposite circumferential direction to that of said narrower portion of said elongate opening of said locking means
of said first group of gears, whereby rotational force is transmitted by either said second group of gears having an odd number of gears or said first group of gears having an even number of gears depending on a rotational direction of said handle.

5. The fishing reel as set forth in claim 1, further comprising:

a third group of gears of said at least two groups of gears, said third group of gears having an even number of gears and a third direction dependent coupling means for unidirectionally transmitting rotational force from said handle shaft to said spool shaft via said gears of said third group when said handle shaft is rotated in a first direction and transmitting no rotational force when said handle shaft is rotated in a second direction;

a fourth group of gears of said at least two groups of gears, said fourth group of gears having an odd number of gears and a fourth direction dependent coupling means for unidirectionally transmitting rotational force from said handle shaft to said spool shaft via said gears of said fourth group when said handle shaft is rotated in said second direction and transmitting no rotational force when said handle shaft is rotated in said first direction;

said third group of gears having a different gear ratio than said first group of gears;

said fourth group of gears having a different gear ratio than said second group of gears;

means for selectively coupling one of said first and third groups of gears with one of said spool shaft and said handle shaft; and means for selectively coupling one of said second and fourth groups of gears with one of said spool shaft and said handle shaft.

6. A fishing reel comprising:

a pair of side frames having a spool shaft rotatably supported by said side flames with one end of said spool shaft protruding sidewards from one of said side flames;

a spool carried on said spool shaft between said side flames;

a handle shaft extending from said side frame from which said spool shaft protrudes sidewards so that the lengthwise axis of said handle shaft is in parallel relationship to that of said spool shaft, said handle shaft having a handle coupled to said handle shaft for applying rotational force to said spool;

a means for rotating said spool provided between said spool shaft and said handle shaft for transmitting rotational force effected by rotation of said handle to said spool for maintaining rotation of said spool in a predetermined direction regardless of a rotational direction of said handle, said means for rotating having at least two groups of gears;

a first group of said at least two groups of gears having an even number of gears and a first direction dependent coupling means for unidirectionally transmitting rotational force from said handle shaft to said spool shaft via said gears of said first group when said handle shaft is rotated in a first direction and transmitting no rotational force when said handle shaft is rotated in a second direction;

a second group of said at least two groups of gears having an odd number of gears and a second direction dependent coupling means for unidirectionally transmitting rotational force from said handle shaft to said spool shaft via said gears of said first group when said handle shaft is rotated in said second direction and transmitting no rotational force when said handle shaft is rotated in said first direction; and said gears in said first group of gears having a different gear ratio than said gears in said second group of gears for adjusting a gearing ratio of said spool shaft to said handle shaft by changing a rotational direction of said handle.

7. The fishing reel as set forth in claim 6, wherein:

each of said gears in said second group of gears is engaged with each other in line and said second group has a pair of outermost gears;

each of said gears in said first group of gears is engaged with each other in line and said first group has a pair of outermost gears;

the outermost gears of each of said first and second groups of gears connecting said first and second groups of gears to said spool shaft and said handle shaft, whereby said second group of gears enables said handle shaft to rotate said spool shaft in a predetermined direction when said handle is rotated in a first direction and said first group of gears enables said handle shaft to rotate said spool shaft in the predetermined direction when said handle is rotated in a second direction opposite said first direction; and one of said outermost gears of said first group of gears and one of said outermost gears of said second group of gears each have one of said direction dependent coupling means for unidirectionally coupling its respective gear group to one of said spool shaft and said handle shaft.

8. The fishing reel as set forth in claim 7, wherein each of said direction dependent coupling means comprises;

an inner plate and an outer ring slidably fitted around said inner plate;

said outer ring having an outer periphery with teeth for engaging gears thereby forming a respective one of said pair of outermost gears; and a locking means in said inner plate, said locking means including:

a tapered elongate opening positioned at a peripheral portion of said inner plate extending substantially in a circumferential direction of said inner plate and opening to an inner periphery of said outer ring said elongate opening having a narrower portion and a wider portion;

an abutting member loosely positioned in said elongate opening, the diameter of said abutting member being larger than said narrower portion and smaller than said wider portion so as to be movable between said narrower portion and said wider portion;

a pressing member biased by a spring against said abutting member such that said abutting member is maintained in contact with the inner periphery of said outer ring at any point in said elongate opening;

said abutting member being lockable between said inner plate and said outer ring when said abutting member is moved into said narrower portion of said elongate opening by rotation of said outer ring relative to said inner plate in a first direction to transmit rotational force to said spool;

said abutting member being unlockable by movement into said wider portion in response to rotation of said outer ring relative to said inner plate in a second direction so as not to transmit said rotational force to said spool; and said narrower portion of said elongate opening of said locking means of said second group of gears being directed to an opposite circumferential direction to that of said narrower portion of said elongate opening of said locking means of said first group of gears, whereby rotational force is transmitted by either said second group of gears having an odd number of gears or said first group of gears having an even number of gears depending on a rotational direction of said handle.

9. The fishing reel as set forth in claim 6, wherein further comprising:

a third group of gears of said at least two groups of gears, said third group of gears having an even number of gears and a third direction dependent coupling means for unidirectionally transmitting rotational force from said handle shaft to said spool shaft via said gears of said third group when said handle shaft is rotated in a first direction and transmitting no rotational force when said handle shaft is rotated in a second direction;

a fourth group of gears of said at least two groups of gears, said fourth group of gears having an odd number of gears and a fourth direction dependent coupling means for unidirectionally transmitting rotational force from said handle shaft to said spool shaft via said gears of said fourth group when said handle shaft is rotated in said second direction and transmitting no rotational force when said handle shaft is rotated in said first direction;

said third group of gears having a different gear ratio than said first group gears;

said fourth group of gears having a different gear ratio than said second group of gears;

means for selectively coupling one of said first and third groups of gears with one of said spool shaft and said handle shaft; and means for selectively coupling one of said second and fourth groups of gears with one of said spool shaft and said handle shaft.

10. A fishing reel comprising:

a reel frame;

a spool shaft and a handle shaft supported on said reel frame;

a spool mounted on said spool shaft;

means for connecting said spool shaft to said handle shaft, said means for connecting including:

at least two groups of wheels for transmitting rotational force from said handle shaft to said spool shaft, a first group of wheels having an even number of wheels, a second group of wheels having an odd number of wheels; and each of said first and second groups having direction dependent coupling means for unidirectionally transmitting rotational force from said handle shaft to said spool shaft upon rotation of said handle shaft in a respective one of two opposite directions, whereby the spool shaft rotates in a predetermined direction when the handle shaft rotates in either the predetermined direction or a direction opposite to the predetermined direction, said direction dependent coupling means including:

one wheel of each of said first and second groups of wheels being coupled to one of said spool shaft and said handle shaft, said one wheel having a first part carried on said one of said spool shaft and said handle shaft each and a second part detachably coupled to said first part, and a means for locking said first part and said second part together to transmit rotational force from said handle shaft to said spool shaft responsive to a single direction of rotation of said handle shaft.

11. The fishing reel as set forth in claim 10, wherein each of said wheels of said first group of wheels has a diameter different from each of said wheels in said second group of wheels.

* * * * *